United States Patent [19]

Hong et al.

[11] Patent Number: 5,127,054
[45] Date of Patent: Jun. 30, 1992

[54] SPEECH QUALITY IMPROVEMENT FOR VOICE CODERS AND SYNTHESIZERS

[75] Inventors: Daehyoung Hong, Hanover Park; Michael D. Kotzin, Buffalo Grove; Anthony P. van den Heuvel, Arlington Heights, all of Ill.

[73] Assignee: Motorola, Inc., Schaumburg, Ill.

[21] Appl. No.: 600,271

[22] Filed: Oct. 22, 1990

Related U.S. Application Data

[63] Continuation of Ser. No. 188,014, Apr. 29, 1988, abandoned.

[51] Int. Cl.⁵ .............................................. G10L 5/00
[52] U.S. Cl. ................................................. 381/36
[58] Field of Search ...................... 381/36–43, 381/51–53; 395/2

[56] References Cited

U.S. PATENT DOCUMENTS 3,995,115  11/1976  Kelly ........................... 381/36
4,667,340  5/1987   Arjmand et al. .............. 381/31
4,771,465  9/1988   Bronson ....................... 381/36

Primary Examiner—Emanuel S. Kemeny
Attorney, Agent, or Firm—Thomas G. Berry; Steven G. Parmelee; Susan L. Lukasik

[57] ABSTRACT

A harmonic signal is created from a limited spectral representation of a voice signal. The harmonic signal is combined with the at least a portion of the limited delayed spectral signal to provide a reconstructed speech signal having perceptually improved audio quality.

14 Claims, 1 Drawing Sheet

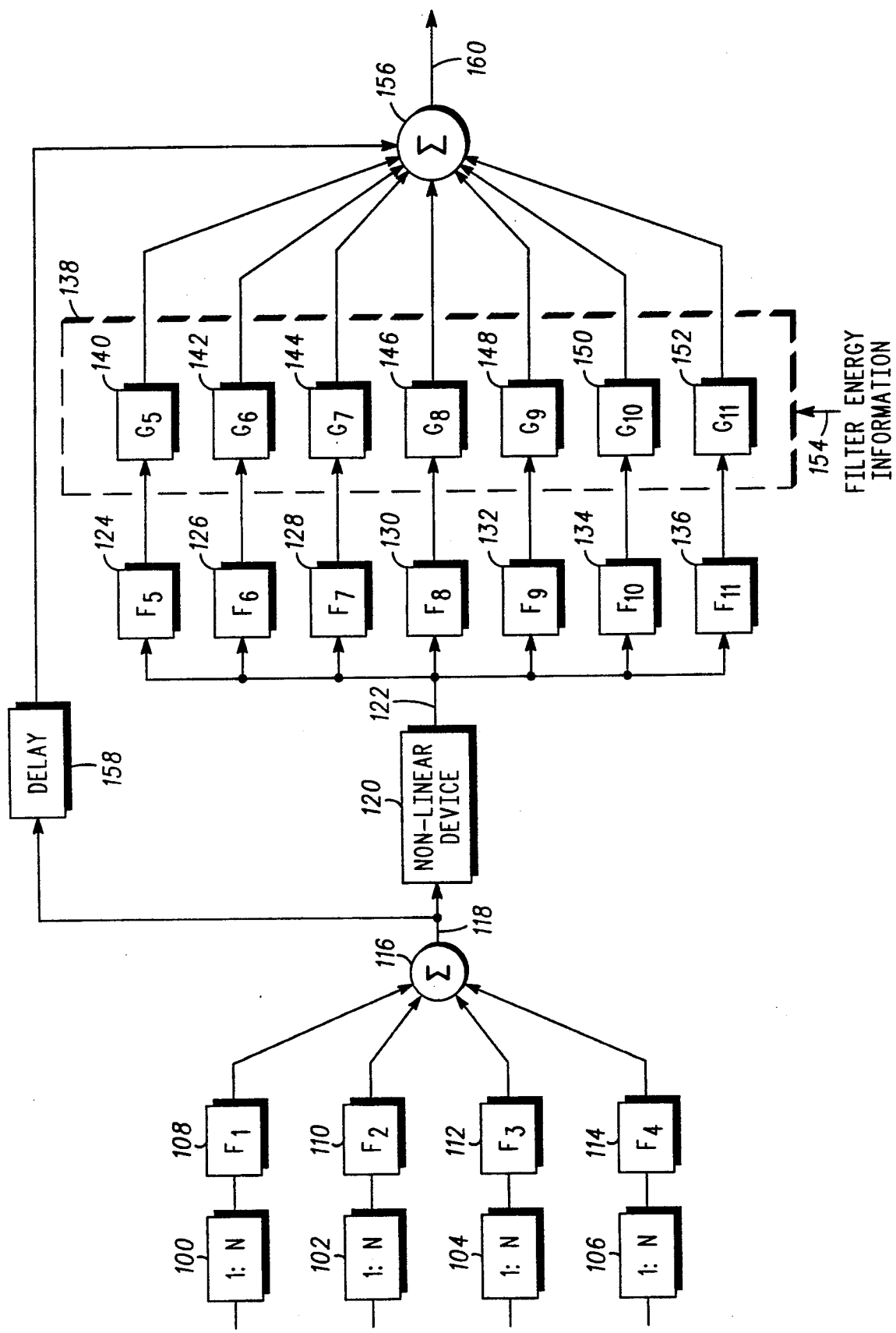

SPEECH QUALITY IMPROVEMENT FOR VOICE CODERS AND SYNTHESIZERS

This is a continuation of application Ser. No. 188,014, filed Apr. 28, 1988 and now abandoned.

TECHNICAL FIELD

This invention relates generally to voice coders and voice synthesizers and more specifically to a technique for improving the quality of a reconstructed voice signal.

BACKGROUND ART

Low bit-rate voice coders are currently being investigated as a means of reducing the amount of information required for transmission or storage. One such voice coder is a digital sub-band coder, which operates on speech segments to divide a speech signal into several spectral sub-bands to determine where significant speech energy resides. Typically, a predetermined number of digital bits are allocated among those significant sub-bands to code the spectral information for transmission.

In a context of a radio frequency communication system, only the essential spectral information is transmitted to a receiver, which reconstructs or synthesizes the speech signal by routing the essential spectral information to reconstruction sub-band filters. In an attempt to avoid "hollow" sounding speech or artifacts caused by not transmitting all of the spectral bands, conventional designers of sub-band coders pass noise through any unexcited sub-band filters in an attempt to perceptually improve the audio quality of the synthesized speech. The filtered noise signals are combined with the transmitted spectral information to generate a more natural sounding speech signal. The amount of noise added in each spectral band is usually scaled in proportion to the amount of speech energy originally present in the corresponding band.

Of course, other speech coders exist, which produce "essential" spectral information, such as, for example, linear predictive coders. Nevertheless, all such speech coders (processors) operate at a fundamental level by processing an input signal to reduce or minimize the spectral information needed to reconstruct or synthesize a speech signal. These speech tecnhiques also beneficially utilize an added filtered or processed noise signal to provide perceptually improved quality synthesized speech.

The current trend in low bit-rate coders provides for further reduction in the amount of speech information that is transmitted. Thus, more reliance must be placed upon other processing techniques to adequately reconstruct a natural sounding speech signal While processed noise signals may be appropriate in some cases, a need exists to provide a technique to achieve high quality synthesized speech signal suitable for use with low bit-rate coders and voice synthesizers.

SUMMARY OF THE INVENTION

Accordingly, it is an object of the present invention to provide a method for improving the quality of a reconstructed speech signal.

Briefly, according to the invention, a harmonic signal is created from at least a limited spectral representation of a voice signal. The harmonic signal is combined with the essential speech information to provide a reconstructed speech signal having perceptually improved audio quality.

BRIEF DESCRIPTION OF THE DRAWING FIGURE

The drawing FIGURE is a block diagram of the present invention embodied in a sub-band type decoder.

DETAILED DESCRIPTION OF THE PREFERRED EMBODIMENT

Referring now to the drawing FIGURE there is shown a block diagram of a sub-band vo-coding synthesizer in accordance with the present invention. It is known in the sub-band vo-coding art for a vo-coding analyzer to separate time segments of sampled speech signals into a plurality of spectral sub-bands, which may be analyzed to determine a particular subset of spectral sub-bands containing the significant proportion of the speech energy. The spectral information contained in the particular subset of spectral bands is transmitted together with "overhead" information, which may include data for identifying the transmitted sub-bands, the amount of speech energy for some (or all) of the remaining spectral sub-bands, or other information that may be suitable to transmit in any particular embodiment of a sub-band coding system.

According to the invention, the essential spectral information consists of decimated samples of the most significant spectral sub-bands. These samples are appropriately interpolated (preferably by a factor of sixteen) (100-106), and routed to a plurality of reconstruction filters (108-114). The reconstruction filters preferably comprise digitally implemented polyphase or quadrature mirror filters having the same bandpass characteristic as the analyzing sub-band filters employed in an encoding unit (not shown). In the drawing FIGURE, there are illustrated four spectral sub-band filters F1-F4, the combined (116) outputs of which comprise the essential spectral information (118). The essential spectral information (118) is routed to a non-linear device (120), which preferably comprises a full-wave rectifier capable of producing a plurality of harmonics of the essential spectral information.

The non-linear device (120) produces a harmonic signal (122), which comprises a plurality of harmonic signals generated from the essential spectral information (118) contained in the selected speech sub-bands. Thus, the harmonic signal (122) is enriched with information directly related to the actual voice signal, and not based on processed noise as is customary in contemporary vo-coding practices.

The harmonic signal (122), is routed to a plurality of sub-band filters (124-136), which band-limit the harmonic signal (122) to the particular bands of interest. As may be seen in the drawing FIGURE, the particular bands of interest are represented by each of the sub-band filters F5-F11. The filters F5-F11 correspond in spectral position to, and represent at least a portion of, the remaining non-selected sub-bands at the encoder (not shown). Therefore, in the example illustrated in the drawing FIGURE, eleven sub-bands were used to filter the original voice signal, four of which were selected and seven of which were unselected. Of course, any suitable arrangement of filters may be used in a particular implementation.

Preferably, the filtered harmonic signals are gain adjusted by an optional gain stage (138), which consists of gain stages (140-152). The gain of each filtered harmonic signal is adjusted in proportion to the speech energy present in the corresponding sub-band (124–136) of the original speech signal. These energy values are made available to the decoder as "overhead" data (154). The gain adjustment factors may be easily computed from the energy of the filtered (124–136) harmonic signal (122) over an appropriate time interval. In any event, the filtered and gain adjusted (weighted) harmonic signals are combined (156) with a delayed (158) version of the essential spectral information (118). This provides a reconstructed signal (160) that may be further processed in accordance with any particular implementation. Preferably, the invention is implemented using a digital signal processor (DSP) such as the DSP56000 manufactured by Motorola, Inc., or its functional equivalent. In this way, the delay (158) may be simply accomplished by memory storage within the DSP; the delay being adjusted to compensate for the processing time of the harmonic signal (122) through the filters (124–136) and the gain adjusting stage (138).

Viewed in the frequency domain, those skilled in the art will appreciate that the essential spectral information resides (or may be adapted to reside) in a small band in the frequency domain. This is a desirable characteristic of vo-coders in general in that it reduces the amount of information required to be transmitted or stored. When processed by a non-linear device, a plurality of harmonics will be generated. The harmonic signals are bandlimited by the filters (124–136) and combined with the essential spectral information (118) to expand the occupied bandwidth of the reconstructed signal such that a perceptually improved quality reconstruction of the original voice signal is provided.

Alternately, the non-linear device (120) and the harmonic signal (122) may be used in combination with a noise source or processed noise signals. Since the harmonic content is directly related to the essential speech information, a higher quality reconstruction of the voice signal is provided than that available through the conventional practice of filling the occupies bandwidth with a processed noise signal.

The non-linear processing used to create the harmonic signal enables the present invention to afford improved quality of a reconstructed signal without regard to the particular vo-coder used, or speech synthesizer technique employed. In this way, a reconstructed signal having improved quality is provided by the present invention.

What is claimed is:

1. A method for generating a reconstructed information signal, comprising the steps of:
    combining outputs of a plurality of sub-band filters to produce a limited spectral signal;
    generating a harmonic signal by applying said limited spectral signal to a non-linear device;
    delaying said limited spectral signal;
    processing said harmonic signal to provide a processed harmonic signal that is at least partially related to said harmonic signal; and
    combining said delayed limited spectral signal with said processed harmonic signal, generating the reconstructed information signal.

2. The method of claim 1, wherein said processing step comprises the step of sub-band filtering said harmonic signal.

3. The method of claim 2, further comprising the step of adjusting said sub-band filtered harmonic signal to provide spectral amplitude weighting.

4. The method of claim 2, wherein the sub-band filtering is performed with different sub-bands than the sub-band filters producing said limited spectral signal.

5. An apparatus for generating a reconstructed information signal, comprising:
    means for combining outputs of a plurality of sub-band filters to produce a limited spectral signal;
    means, coupled to said means for combining, for generating a harmonic signal by applying said limited spectral signal to a non-linear device;
    means, coupled to said means for combining, for delaying said limited spectral signal;
    means, coupled to said means for generating, for processing said harmonic signal to provide a processed harmonic signal that is at least partially related to said harmonic signal; and
    means, coupled to said means for delaying, for combining said delayed limited spectral signal with said processed harmonic signal, generating the reconstructed information signal.

6. The apparatus of claim 5, wherein said non-linear device comprises a full-wave rectifier.

7. The apparatus of claim 5, wherein said means for processing comprises means for sub-band filtering said harmonic signal.

8. The apparatus of claim 7, further comprising means, coupled to said means for sub-band filtering, for adjusting said sub-band filtered harmonic signal to provide spectral amplitude weighting.

9. The apparatus of claim 7, wherein the sub-band filters use different sub-bands than the sub-band filters producing said limited spectral signal.

10. A method for generating a reconstructed information signal, comprising the steps of:
    combining outputs of a plurality of sub-band filters to produce a limited spectral signal;
    generating a harmonic signal by applying said limited spectral signal to a non-linear device;
    sub-band filtering said harmonic signal;
    adjusting said sub-band filtered harmonic signal to provide spectral amplitude weighting;
    delaying said limited spectral signal; and
    combining said delayed limited spectral signal with said adjusted harmonic signal, generating the reconstructed information signal.

11. The method of claim 10, wherein the sub-band filtering is performed with different sub-bands than the sub-bands used to produce said limited spectral signal.

12. An apparatus for generating a reconstructed information signal, comprising:
    means for combining outputs of a plurality of sub-band filters to produce a limited spectral signal;
    means, coupled to said means for combining, for generating a harmonic signal by applying said limited spectral signal to a non-linear device;
    means, coupled to said means for generating, for sub-band filtering said harmonic signal;
    means, coupled to said means for sub-band filtering, for adjusting said sub-band filtered harmonic signal to provide spectral amplitude weighting;
    means, coupled to said means for combining, for delaying said limited spectral signal; and
    means, coupled to said means for delaying, for combining said delayed limited spectral signal with said adjusted harmonic signal, generating the reconstructed information signal.

13. The apparatus of claim 12, wherein the sub-band filters use different sub-bands than the sub-band filters producing said limited spectral signal.

14. The apparatus of claim 12, wherein said non-linear device comprises a full-wave rectifier.

* * * * *